(12) United States Patent
Niu et al.

(10) Patent No.: US 10,496,315 B1
(45) Date of Patent: Dec. 3, 2019

(54) UNIFIED TIER AND CACHE STRUCTURE

(71) Applicant: Western Digital Technologies, Inc., San Jose, CA (US)

(72) Inventors: Junpeng Niu, Singapore (SG); Jun Xu, Singapore (SG); Robin O'Neill, Trabuco Canyon, CA (US); Jie Yu, Irvine, CA (US); Grant Mackey, Irvine, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/028,387

(22) Filed: Jul. 5, 2018

(51) Int. Cl.
*G06F 12/00* (2006.01)
*G06F 3/06* (2006.01)
*G06F 12/02* (2006.01)

(52) U.S. Cl.
CPC .......... *G06F 3/0644* (2013.01); *G06F 3/0604* (2013.01); *G06F 3/068* (2013.01); *G06F 3/0611* (2013.01); *G06F 3/0646* (2013.01); *G06F 3/0647* (2013.01); *G06F 3/0653* (2013.01); *G06F 12/0238* (2013.01); *G06F 12/0246* (2013.01)

(58) Field of Classification Search
CPC .... G06F 3/0644; G06F 3/0604; G06F 3/0611; G06F 3/0653; G06F 3/068; G06F 3/0646; G06F 3/0647; G06F 12/0238; G06F 12/0246
See application file for complete search history.

(56) References Cited

U.S. PATENT DOCUMENTS

2013/0086245 A1   4/2013  Lu et al.
2015/0324125 A1*  11/2015 Li .................... G06F 3/0631
                                                711/103

* cited by examiner

*Primary Examiner* — Shawn X Gu
(74) *Attorney, Agent, or Firm* — Chang & Hale LLP

(57) ABSTRACT

A data storage system may include a first storage pool and a second storage pool, with the second storage pool comprising larger, slower storage drives. The data storage system may associate, with a first data, a first parameter corresponding to an access frequency for short term reads, a second parameter corresponding to access frequency for long term reads, a third parameter corresponding to an access frequency for short term writes, and a fourth parameter corresponding to an access frequency for long term writes. The data storage system may then determine whether to store the first data on the first storage pool or the second storage pool based on at least one of the first parameter, the second parameter, the third parameter, and the fourth parameter.

20 Claims, 7 Drawing Sheets

DATA MIGRATION PROCESS

FIG. 4

| | $LRHD \cap SRHD$ | $LRHD \cap SRHD$ | $LRHD \cap SRHD$ | $LRHD \cap SRHD$ |
|---|---|---|---|---|
| $LWHD \cap SWHD$ | Case A | Case B | Keep at HDD pool | Case C |
| $LWHD \cap SWHD$ | Case D | Case E | Keep at HDD pool | Case F |
| $LWHD \cap SWHD$ | Move to SSD | Copy to SSD | Keep at HDD pool | Move to SSD |
| $LWHD \cap SWHD$ | Case G | Case H | Keep at HDD pool | Case I |

Table 1: Different hotness cases of data in the HDD pool

UNIFIED TIER AND CACHE STRUCTURE

BACKGROUND

Field

The present disclosure relates to data storage systems. In particular, the present disclosure relates to data storage systems that include hard disk drives (HDDs) and solid state drives (SSDs).

Description of Related Art

Users may store data, such as files in various types of data storage systems/architectures. For example, data centers, cloud storage platforms/systems, cloud computing platforms/systems, may use data storage systems/architectures to allow users to store/access data. The data storage systems may include different types of hard disk drives, such as hard disk drives and solid-state drives. The data hard disk drives (HDDs) and solid-state drives (SSDs) may be arranged into arrays and/or sub-arrays (e.g., groups of disk drives). Generally, the solid-state disks and the hard disk drives are used in separate storage pools, storage arrays, or storage sub-arrays (e.g., one sub-array/pool may include only solid-state drives or only hard disk drives). The pools of storage drives may be arranged into different tiers of data storage, with a smaller storage amount of faster SSDs in one tier and a larger storage amount of slower HDDs in a second tier.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 4 illustrates a table showing the different hotness cases of data in the HDD pool 125, in accordance with one or more embodiments.

DETAILED DESCRIPTION

Figure 1:
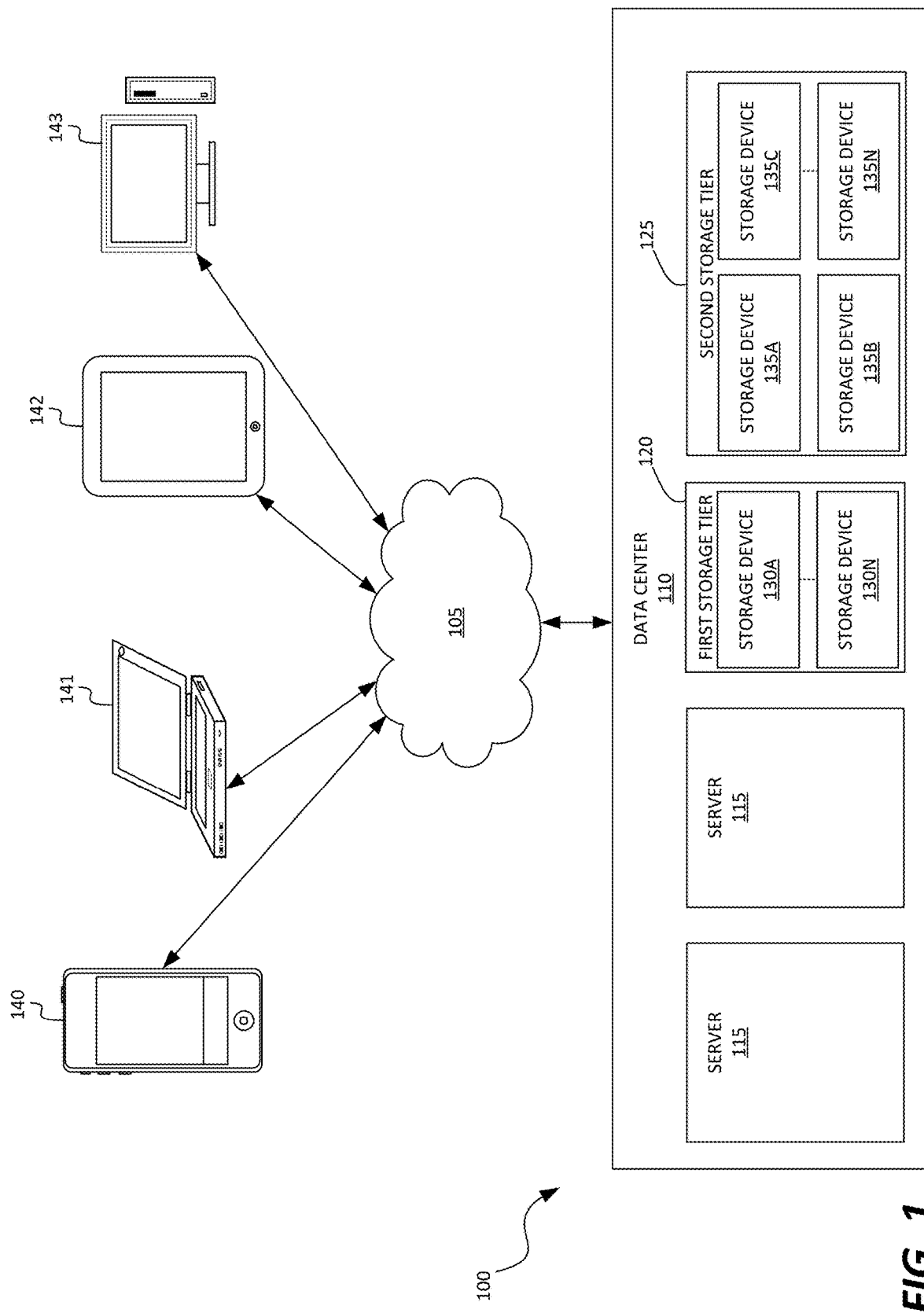
FIG. 1 is a diagram of an example system architecture for a unified storage system, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Unified Storage Systems

As discussed above, storage architectures/systems (which may be used in data centers, cloud storage platforms/ systems, cloud computing platforms/systems, etc.) may use both solid-state disks and hard disk drives. Generally, the solid-state disks and the hard disk drives are used in separate storage pools, storage arrays, or storage sub-arrays (e.g., one sub-array/pool may include only solid-state drives or only hard disk drives). Thus, the arrays, sub-arrays, pools, etc., that include only solid-state drives may be used as a cache for data accesses and/or may be used to provide higher performance tier(s) for customers (e.g., for customers that pay a higher price for the higher performance). Although solid-state drives may provide higher/faster performance (than hard disk drives), solid-state drives have write cycle limitations. Thus, writing data to the solid-state drives may increase the wear and/or decrease the life (e.g., the decrease the time to failure, decrease the operational life, etc.) of the solid state drives. Although hard disk drives may not have such write cycle limitations, hard disk drives may provide slower/lower performance (than solid-state drives).

Due to the higher performance of SSDs in random access compared with HDDs, SSDs are usually used as the faster tier and/or as the cache pool. In a structure with SSDs as the faster tier, hot data (e.g., frequently accessed data) is migrated from the HDDs to the SSDs to improve the system performance, and at the same time, cold data (e.g., infrequently accessed data) is migrated the other way, from SSDs to HDDs. The hot data in tier is usually identified over a longer time period to reduce the migration cost, compared with the hot data in cache, which can be identified in a shorter time period. However, the short term system performance may be affected since the long-term hot data in tier may not be frequently accessed in the short term.

In the structure of SSDs as cache, the hot data is usually identified through access frequency and recency, which can be identified in a shorter time period, and does not consider the long-term hotness. However, items frequently accessed over longer time periods could be pushed out of the cache before the next access, in favor of more recently accessed items. Thus, a unified structure for tiering and caching could take advantage of the benefits of both structures, while reducing the drawbacks.

Certain embodiments described herein provide the ability to treat a pool of storage devices, such as SSDs, as both a cache and a tier in a unified structure. That is, like a standalone high tier, a unified first pool (e.g., composed of SSDs and/or other fast storage devices) can store external input/output (I/O) hot data and hot data sourced from an HDD pool. In addition, like a standalone cache pool, the unified first pool can also store the hot data identified and copied from the HDD pool.

In an embodiment of a unified framework, the cache and tier have no essential divergence, except for the residence time and move/copy polices. An internal hot data identifier can be utilized to provide the ability to distinguish the hot data to be moved (tiered) or copied (cached). To differentiate the hot data, the data can be further categorized into short-term hot data and long-term hot data, in addition or in lieu of distinguishing data by the properties of "read vs write" and/or "hot vs cold".

FIG. 1 is a diagram of an example system architecture for a unified storage system 100, in accordance with one or more embodiments. A network 105 is connected to a data center 110, which houses one or more components of the unified storage system 100. In some embodiments, the unified storage system 100 comprises one or more servers or server computing devices 115 and a first storage pool 120 and a second storage pool 125. In some embodiments, there may be more than two storage pools. The first storage pool can comprise one or more storage devices 130A-130N. Likewise, the second storage pool can comprise one or more storage devices 135A, 135B, 135C-135N. In one embodiment, the first storage pool comprises of faster storage devices, such as SSDs, that are suitable for use as a cache. Meanwhile, the second storage pool can comprise of typically slower and/or larger storage devices. Faster storage devices are typically more expensive per gigabyte and so the second storage pool is generally larger in aggregate than first second storage pool.

The unified storage system 100 may be communicatively coupled to one or more client computing device 140-143 via the network 105. The unified storage system 100 may provide various computing devices 140-143 (e.g., client devices, smartphones, cable set-top boxes, smart TV's, video game consoles, laptop computers, tablet computers, desktop computers, etc.) with access to various types of data (e.g., files) stored on the storage pools 120, 125. For example, the unified storage system 100 may provide file-based data storage services to a client computing device 140. The unified storage system 100 may also allow users to store various types of user data on the storage pools.

The network 105 may include one or more of an ad hoc network, a peer to peer communication link, an intranet, an extranet, a virtual private network (VPN), a public network (e.g., the Internet), a private network (e.g., a local area network (LAN)), or wide area network (WAN) such as the Internet, a wired network (e.g., Ethernet network), a wireless network (e.g., an 802.11 network, a Wi-Fi network, a wireless LAN (WLAN), a wireless WAN (WWAN), etc.), a cellular network (e.g., a Long Term Evolution (LTE) network), a metropolitan area network (MAN), a portion of the Internet, a portion of the Public Switched Telephone Network (PSTN), routers, hubs, switches, server computers, other types of computer network, and/or a combination thereof.

The storage pools 120, 125 may store data and/or data objects that may be accessed by the client computing device 130. The storage pools 120, 125 may include multiple data storage devices (e.g., multiple storage drives such as hard disk drives (HDDs), solid state drives (SSDs), etc.). A data storage device may comprise magnetic media (e.g., magnetic discs, shingled magnetic recording (SMR) media/discs, etc.) and/or solid-state media. In some embodiments, the storage pools 120, 125 may be coupled to the network 105. In other embodiments, the storage pools 120, 125 may be include in and/or part of the server computing devices 115. For example, the storage pools 120, 125 may be in the same rack, housing, chassis, etc., as the server computing device 115.

While certain description herein may refer to solid state memory or flash memory generally, it is understood that solid state memory and/or flash memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, Electrically Erasable Programmable Read-Only Memory (EEPROM), Ferroelectric Memory (FeRAM), Magnetoresistive RAM (MRAM), other discrete NVM (non-volatile memory) chips, or any combination thereof.

The storage pools 120, 125 may include a set of solid-state drives (e.g., one or more solid-state drives) and a set of hard disk drives (e.g., one or more hard disk drives). In one embodiment the first storage pool comprises solid-state drives, which may be homogenous drives. For example, each of the solid-state drives in the set of solid-state drives (for a sub-array) may have the same capacity (e.g., storage capacity, storage space, etc.), the same model number/manufacturer, the same type of flash memory (e.g., single-level cell (SLC), multi-level cell (MLC), tri-level cell (TLC), etc.), the same performance/throughput, etc. In another embodiment, the set of solid-state drives may include a plurality of heterogeneous drives. For example, each of the solid-state drives in the set of solid-state drives in the pool may have different capacities, different model numbers/manufacturers, the different types of flash memory, different performances/throughputs, etc.

In one embodiment, the second storage pool 125 comprises hard disk drives, which may be homogenous drives. For example, each of the hard disk drives in the set of hard disk drives in the pool (or sub-sets of the pool) may have the same capacity (e.g., storage capacity, storage space, etc.), the same model number/manufacturer, the same disk layout (e.g., the same sectors per track, the same block size, etc.), and/or the same type of magnetic media (e.g., SMR media/discs, etc.). In another embodiment, the set of hard disk drives may include a plurality of heterogeneous drives. For example, each of the hard disk drives in the set of hard disk drives (for the sub-array) may have the different capacities, different model numbers/manufacturers, different disk layouts, and/or the different types of magnetic media.

In one embodiment, the set of storage drives (e.g., SSDs, HDDs, solid-state hybrid drives (SSHDs)) in the storage pools 120, 120 may have one or more data throughputs. The data throughputs for the set of storage drives may include one or more of the sequential read throughput (e.g., the amount of data that be read sequentially in a period of time), sequential write throughput (e.g., the amount of data that can be written sequentially in a period of time), the random read throughput (e.g., the amount of data that be read randomly in a period of time), and random write throughput (e.g., the amount of data that can be written randomly in a period of time). The storage drives in the set may have the same data throughputs (when homogenous drives are used) or may have different data throughputs (when heterogeneous drives are used).

Storage architectures/systems (which may be used in data centers, cloud storage platforms/systems, cloud computing platforms/systems, etc.), such as the first storage pool 120 and the second storage pool 125, may use both solid-state disks and hard disk drives. Generally, the solid-state disks and the hard disk drives are used in separate storage pools, storage arrays, or storage sub-arrays (e.g., one sub-array/pool may include only solid-state drives or only hard disk drives). For example, the arrays, sub-arrays, pools, etc., that include only solid-state drives may have higher performance (e.g., throughput, access times, read times, write times, etc.) than arrays, sub-arrays, pools, etc., that include only hard-disk drives. Thus, the arrays, sub-arrays, pools, etc., that include only solid-state drives may be used as a cache for data accesses and/or may be used to provide higher performance for customers (e.g., for customers that pay a higher price for the higher performance).

Although solid-state drives may provide higher/faster performance (e.g., higher sequential/random throughput, faster access times, etc.), solid-state drives have write cycle limitations. For example, writing data to the flash memory (e.g., SLC cells, MLC cells, TLC cells, etc.) may cause wear on the flash memory (e.g., on the SLC cells, MLC cells, TLC cells, etc.). Thus, writing data to the solid-state drives may increase the wear and/or decrease the life (e.g., the decrease the time to failure, decrease the operational life, etc.) of the solid state drives. Although hard disk drives may not have such write cycle limitations, hard disk drives may provide slower/lower performance (than solid-state drives). For example, it may be slower to read data from a hard disk drive when compared to a solid-state drive. However, for sequential accesses (e.g., sequential reads and/or writes), a hard disk drive may have performance close to, similar to, and/or competitive with solid state drives. For example, shingled magnetic record (SMR) hard disk drives may have performance (e.g., sequential read throughput, sequential write throughput, etc.) that is close to the performance of solid-state drives. Thus, it may be beneficial to write data that will be sequentially accessed, to the hard disk drives.

Figure 2:
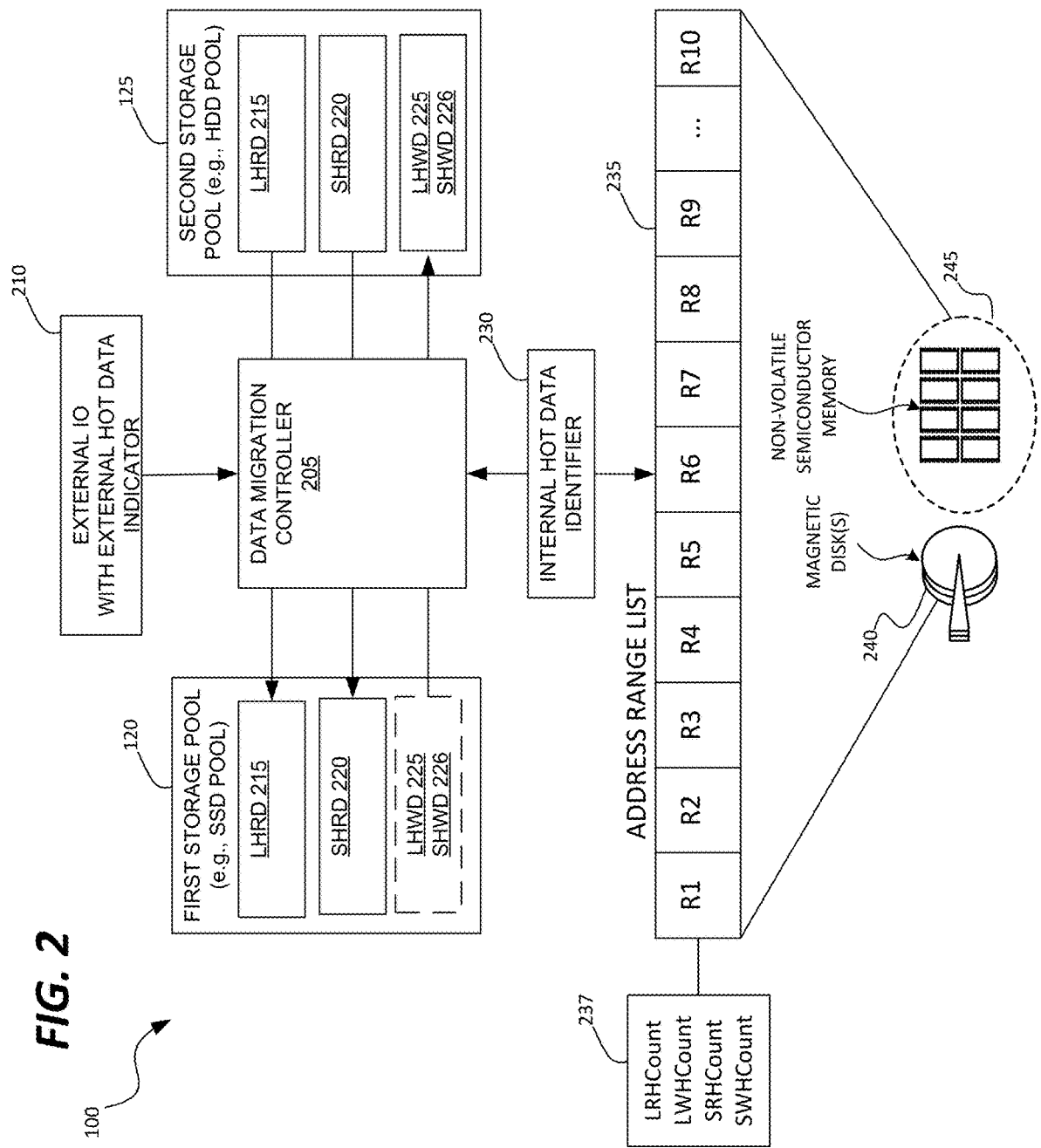
FIG. 2 illustrates a block diagram of an embodiment of the unified storage system, in accordance with one or more embodiments.

FIG. 2 illustrates a block diagram of an embodiment of the unified storage system 100. In the illustrated embodiment, the unified storage system 100 comprises a data migration controller 205 for determining the whether to copy or move data in the first storage pool 120 and the second storage pool 125. The data migration controller may be implemented as hardware (e.g., CPU, integrated circuit, microprocessor etc.) and/or software. It may be in the same computing device as the storage devices in the storage pools or may be on a separate computing device.

When data is received in an external I/O 210 operation, the data migration controller 205 can determine whether the data is hot data. Such a determination can be done using an external hot data indicator, which may be an explicit identifier tagging the data or may be a characteristic of the data that the data migration controller 205 utilizes to identify that the data is hot data. For example, data for a frequently accessed website may be identified as hot data.

In another example, the data migration controller 205 may determine whether the data that is stored in the storage pools 120, 125 is randomly accessed data or sequentially accessed data. For example, the data migration controller 205 may determine whether the user is likely to access the data as a continuous set of blocks/pages (e.g., a single file). In another example, the data migration controller 205 may determine whether the user is likely to access the data as random blocks/pages (e.g., different portions of different files). The data migration controller 205 may store the data to the storage pools based on whether the data is randomly access or sequentially accessed, and based on the read/write access frequencies. For example, the data migration controller may determine that certain sequential data may be more likely to be hot data as the complete sequence is likely to be accessed by a user.

Based on certain formulas, as discussed later below, the data migration controller can determine whether the data from the external IO should go to the first storage pool 120 or the second storage pool 125 based on the determined hotness of the data.

For data already stored in the storage pools, an internal hot data identifier 230 can be used by the unified storage system 100 to determine whether the data in the second storage pool 125 is hot or cold, and should be moved or copied to the first storage pool 125. For example, the data migration controller 205 can determine that cold data should be moved back from the first storage pool to the second storage pool or eliminated based on the availability of the data in HDD pool.

In one embodiment, a hot data identification algorithm can be used to differentiate the hot and cold data. The hot data identification algorithm can utilize the external hot data indicator to identify hot data at the external I/O level and can utilize the internal hot data identifier at the first storage pool 120 level and/or the second storage pool 125 level. In one embodiment, the algorithm utilizes metrics related to "read hit on read data (ROR)" and "write hit on write data (WOW)". The frequent ROR data is called hot read data (HRD), the HRD is further categorized as Long-term HRD (LHRD) 215 and Short-term HRD (SHRD) 220, based on the frequency of hits over a short term period and a long term period. The short term period and the long term period may be set arbitrarily in the system 100 and may be tweaked for performance reasons. For example, depending on the type of data handled by a data center, the time periods may need to be longer to account for data accessed less frequently or shorter for frequent data access.

Similarly, the frequent WOW data is called hot write data (HWD), which is further divided to Long-term HWD (LHWD) 225 and Short-term HWD (SHWD) 226. The hot data identification algorithm can use these data properties to decide which storage pool the data should be stored in.

As shown in FIG. 2, the drive capacity can be divided into address ranges, with each range associated with a chunk or user specific size of data. For example, the specified size may be the same as a page size in an SSD. These address ranges are shown as R1, R2 . . . , RN in the figure, and together form the address range list 235. In one embodiment, for each address range, four counters 237 are kept for recording the access frequencies for the long-term/short-term read requests and long-term/short-term write requests. These historical access frequencies can be utilized for the external data allocation and internal data migration.

As described above, the first storage pool 120 and the second storage pool 125 can comprise of magnetic disk 240 based storage drives, non-volatile semiconductor memory 245 based drives, or hybrid-type storage drives such as solid-state hybrid drives (SSHDs). The storage pools 120, 125 may be heterogeneous or homogenous of type of storage device. For example, the first storage pool 120 could comprises solely of SSD drives while the second storage pool 125 could comprise a mix of SSD and HDD drives or solely of HDD drives.

For data received as an external I/O (e.g., as part of a write I/O), that data does not generally need to be distinguished as long-term hot or short-term hot. Therefore, the data can be categorized into four cases, which are $RHD \cap \overline{WHD}$, $\overline{RHD} \cap WHD$, $\overline{RHD} \cap \overline{WHD}$ and $RHD \cap WHD$, where RHD is read hot data and $\overline{RHD}$ is not read hot data, WHD is write hot data and $\overline{WHD}$ is not write hot data and set notation is used to refer to the intersection of those sets.

The external I/O can be a read operation or a write operation. A read I/O can simply be redirected to the storage device that contains the data. Thus, only for write I/O does a storage pool need to be selected as a storage location. The following considers a scenario where the first storage pool 120 comprises faster, but smaller SSD devices and the second storage pool 125 comprises slower, but larger HDD devices.

1. $RHD \cap \overline{WHD}$—best allocate to the first storage pool (typically SSD)
2. $\overline{RHD} \cap WHD$—best allocate to the second storage pool (typically HDD)
3. $\overline{RHD} \cap \overline{WHD}$—best allocate to the second storage pool as the size of HDDs is much larger than SSDs
4. $RHD \cap WHD$: an objective migration function F(t) is designed to determine the choice. F(t) is a time-varying function related to performance (e.g., response time), Quality of Service (QoS), load balance, remaining disk capacity and etc.

An example of F(t) can be defined as follows.

$$f_{HDD}(t)=\beta_{11}(R_1(t)-R_{1f})+\beta_{12}(C_{1f}-C_1(t))+\beta_{13}(I_1(t)-I_{1f})$$

$$f_{SSD}(t)=\beta_{21}(R_2(t)-R_{2f})+\beta_{22}(C_{2f}-C_2(t))+\beta_{23}(I_2(t)-I_{2f})$$

$$F(t)=f_{SSD}(t)-f_{HDD}(t) \quad (4.1.1)$$

In the equation, $\beta_{lm}$, l=1, 2; m=1, 2, 3 are the weighting coefficients. $R_i(t)$, i=1, 2 are the response time of external user requests handled by HDD and SSD, $R_{if}$ is the reference response time related to QoS. $C_i(t)$, i=1, 2 are the remaining effective capacity of HDD and SSD, $C_{if}$, i=1, 2 are the minimum disk space requirement of HDD and SSD, $I_i(t)$, i=1, 2 are the current load (combination of throughput and input/output operations per second (IOPS)) of HDD and SSD, $I_{if}$, i=1, 2 are the reference loads for HDD and SSD.

$$I(t) = \alpha_1 \frac{P_S(t)}{P_{S,max}} + \alpha_2 \frac{P_R(t)}{P_{R,max}} \quad (4.1.2)$$

$P_S$ and $P_R$ are the average sequential (throughput) and random (IOPS) performance for the HDD pool or SSD pool, respectively. $P_{S,Max}$ and $P_{r,Max}$ are the maximum sequential (throughput) and random (IOPS) performance of HDDs or SSDs in each sub array. $\alpha_i$, i=1, 2 are the coefficients for the throughput and IOPS calculation.

In one embodiment, the data migration controller 205 may determine a read access frequency of the data and/or may determine a write access frequency of the data. A read access frequency may indicate how often data (e.g., a file, blocks/pages, etc.) may be read (e.g., accessed) by users and/or may indicate a prediction of how often the data may be read by users. For example, the read access frequency for a data chunk may indicate how often users read the data chunk and/or may indicate a prediction of how often users will read the data chunk. A write access frequency may indicate how often data (e.g., a file, blocks/pages, etc.) may be written to (e.g., accessed) by users and/or may indicate a prediction of how often the data may be written to by users. For example, the write access frequency for a data chunk may indicate how often users write to the data chunk and/or may indicate a prediction of how often users will write to the data chunk. In some embodiments, the data migration controller 205 may receive the access frequency. For example, the data migration controller 205 may read the access frequency for the data from a configuration file. In another example, a user may provide (user input indicating) the access frequency for the data.

Figure 3:
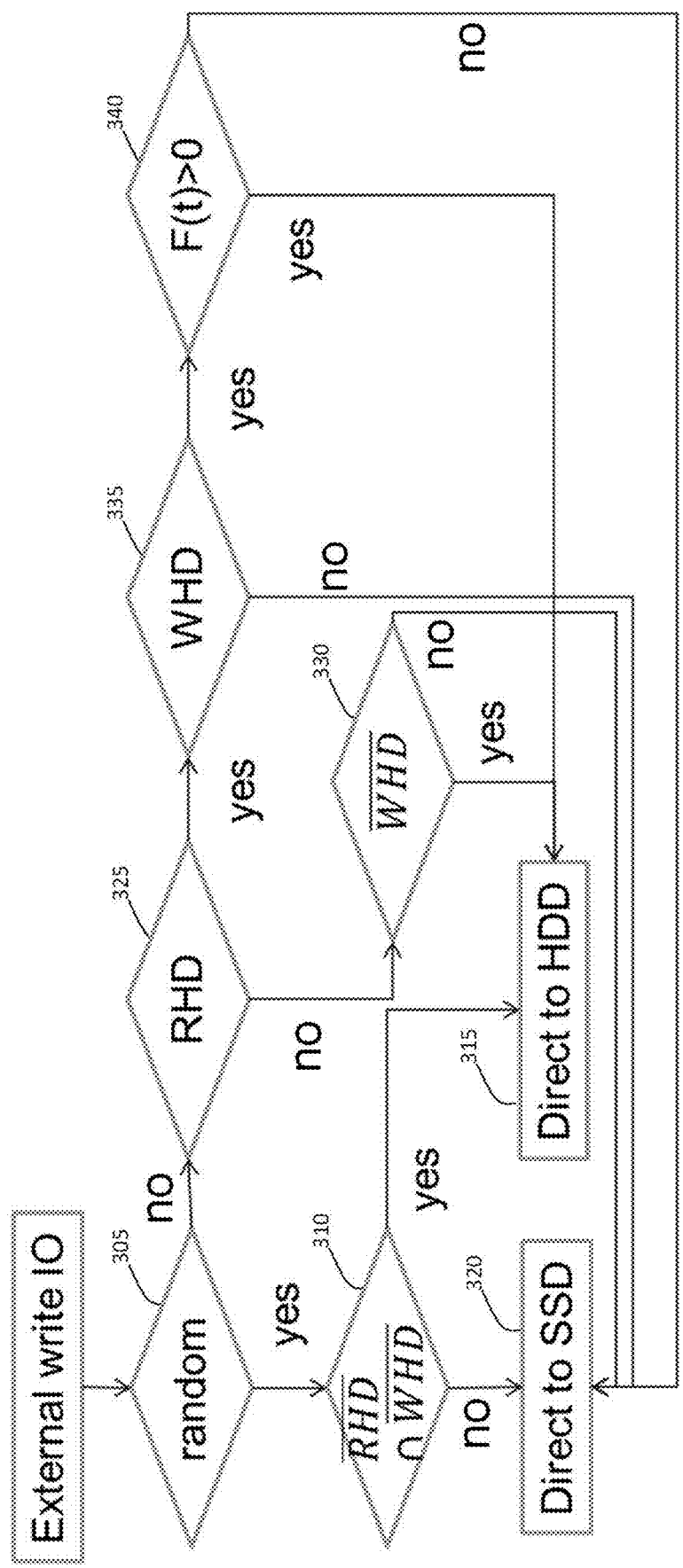
FIG. 3 illustrates a general workflow process 300 for external write inputs/outputs (I/Os).
Figure 5:
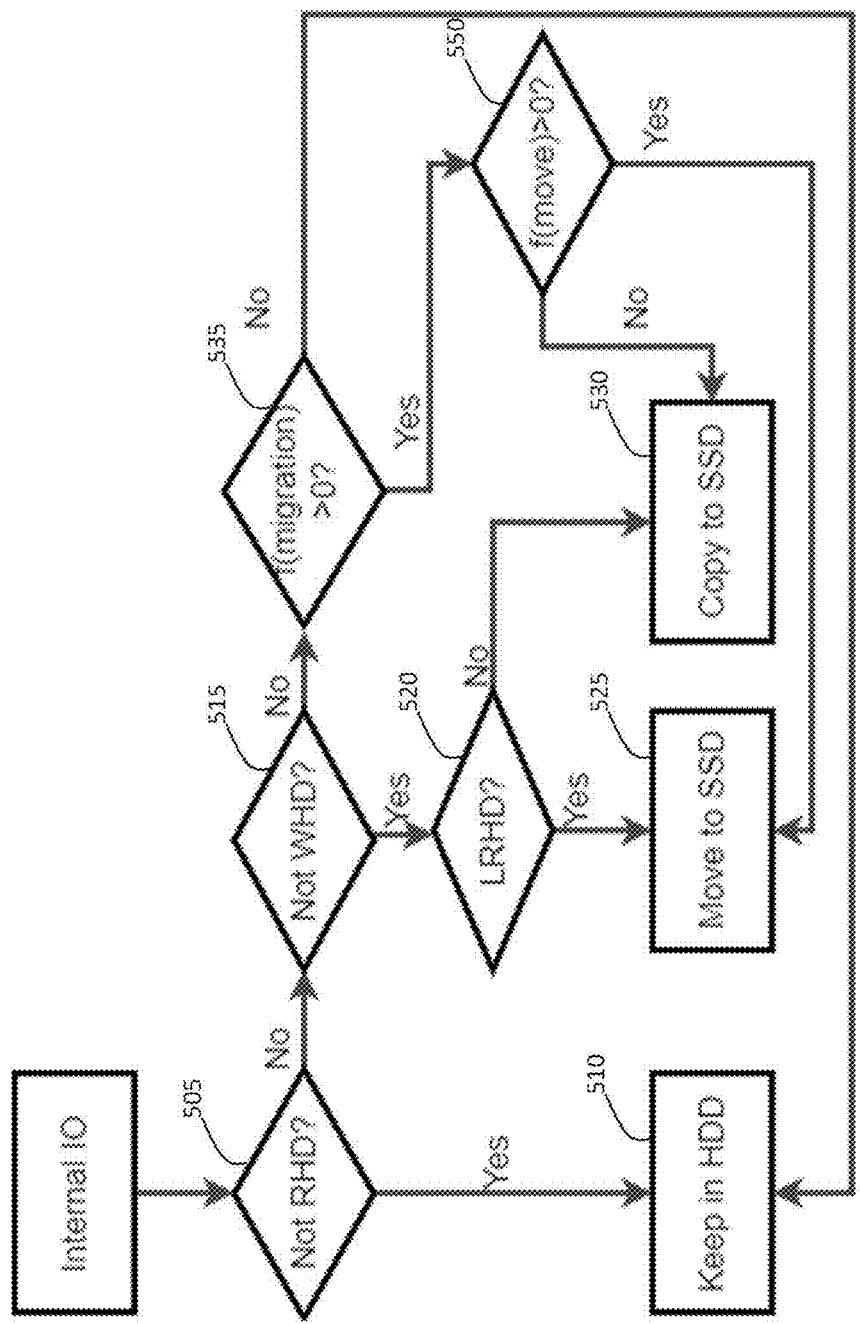
FIG. 5 illustrates a workflow process 500 for the HDD pool 125, in accordance with one or more embodiments.
Figure 6:
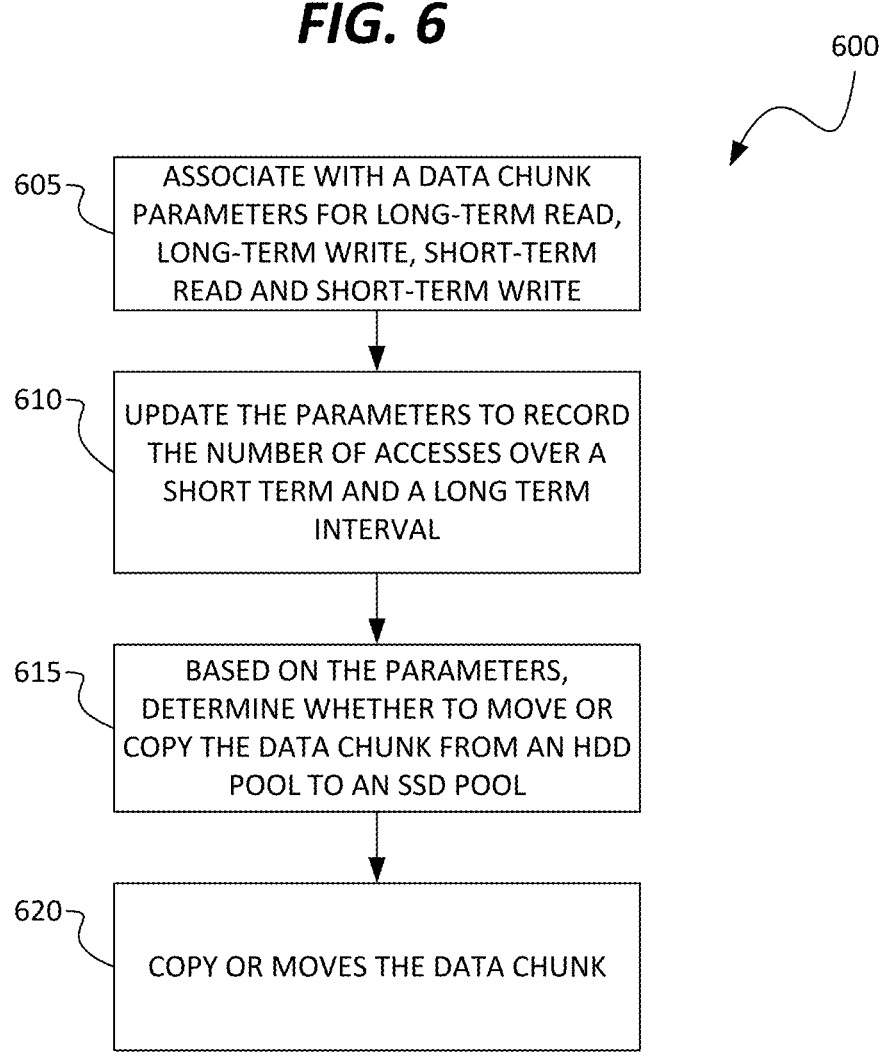
FIG. 6 illustrates a workflow process 600 for the unified storage system 100, in accordance with one or more embodiments.

FIGS. 3, 5 and 6 illustrate various process workflows of the unified storage system 100. The processes may be performed by a data migration controller 205, a processing device (e.g., a processor, a central processing unit (CPU)), and/or a computing device (e.g., a server computing device). The data migration controller, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

For ease of discussion, the following figures and examples refer to an SSD pool in relation to the first storage pool 125 and an HDD pool in relation to the second storage pool 125. However, as has been previously discussed, the storage pools are not limited to homogenous SSD and HDD pools, including having different types of devices within the same pool.

FIG. 3 illustrates a general workflow process 300 for external write I/Os, in accordance with one or more embodiments. At diamond 305, if the I/O pattern is random, it then proceeds to diamond 310. There, if the data is in the set $\overline{RHD} \cap \overline{WHD}$, the workflow proceeds to block 315 and the data will be directed to the HDD pool.

Going back to diamond 310, if the data is not in the set $\overline{RHD} \cap \overline{WHD}$, the workflow proceeds to block 320 and the data is directed to the SSD pool. In one embodiment, in order to guarantee the write performance, the DRAM-buffered random requests will be written to the storage devices in a batch.

If the request is not random (i.e., sequential data), then from diamond 305, the process 300 proceeds to diamond 325 to determine if the data is RHD. At diamond 325, if the data is not RHD the workflow proceeds to diamond 330. If the data is not WHD it is written to the HDD pool at block 315. As the data is not hot data, there is no need to store it in the faster SSD pool and it can be stored in the slower and larger HDD pool.

Going back to diamond 330, if the data is WHD, it is written to the SSD pool at block 320.

If the request is not random (i.e., sequential data) but is RHD (diamond 325), the process then proceeds to diamond 335 to determine if the data chunk is WHD. If the data is not WHD, the process proceeds to block 320 and the data is written to the SSD pool. As the data chunk is read hot data but not write hot data, it should be accessed frequently but should seldom be overwritten. That type of data is better stored in the SSD pool.

Going back to block 335, if the data is WHD, then the workflow proceeds to block 340, where a migration function determines whether to store the data in the SSD pool or the HDD pool. Based on the migration function F(t), the data is either written to the HDD pool (block 315) or written to the SSD pool (block 320).

In one embodiment, the hot data identification algorithm is implemented at the HDD pool level to decide whether and which data needs to be migrated through moving or copying to the SSD pool to improve the future read hit rate. Based on the data hotness properties, the data is categorized as in Table 1 shown in FIG. 4.

FIG. 4 illustrates a table showing the different hotness cases of data in the HDD pool 125, in accordance with one or more embodiments. In certain cases, data chunks are kept at the HDD pool or moved to the SSD 120 pool, as described in Table 1. Table 1 uses the following terms, defined as follows:

SRHD—short term read hot data;
LRHD—long term read hot data;
SWHD—short term write hot data; and
LWHD—long term write hot data.

As discussed above, the intervals for short term and long term can be specified by a user and/or the system.

For example, for data in the set $\overline{LRHD} \cap \overline{SRHD}$, that is, data that is not (short term or long term) read hot data, then that data is stored in the HDD pool, regardless of whether the data is hot or cold write data. Meanwhile, for data in the set $\overline{LWHD} \cap \overline{SWHD} \cap LRHD$, that is, data that is not (short term or long term) write hot data but is also long term read hot data, that data is moved to the SSD pool 120. Likewise, for data in the set $\overline{LWHD} \cap \overline{SWHD} \cap \overline{LRHD} \cap SRHD$, that is, data that is not (short term or long term) write hot data and is both short term read hot data and not long term read hot data, that data is copied to the SSD pool 120. For other situations (Case A-I), the migration function is used to determine whether or not to move or copy the data chunk to the SSD pool.

Discussing an embodiment of the migration function in further detail, to decide whether the data is long-term hot and short-term hot, two time durations are specified, $T_l$ and $T_s$, for the long and short time period, respectively. In an embodiment, these two time periods are associated with each chunk of data tracked by the unified storage system 100, where a chunk is a specified size of data. The two time durations can be set based on different kinds of user requirement, for example, the durations could be set as $T_l$=3600 s and $T_s$=1 s. In one embodiment, the system 100 may track data hit rates and adjust the time periods to find more effective timer periods, without the user setting the time periods manually.

The number of read and write accesses to the specified data range during these two time durations can be counted and recorded, which are referred to as frequency $f_{lr}$, $f_{lw}$, $f_{sr}$ and $f_{sw}$, for long term read, long term write, short term read, and short term write, respectively. Thresholds for the long-term and short-term hotness checking can be specified by the user as $f_{lr}^T$, $f_{lw}^T$, $f_{sr}^T$, and $f_{sw}^T$. In one embodiment, if $f_{lr} > f_{lr}^T$, the data is treated as long-term read hot data, and if $f_{sr} > f_{sr}^T$, the data is treated as short-term read hot data. The same patterns can be applied to the write data.

In one embodiment, counting the frequency of the data accesses is performed using the moving average method. All the access timestamp and the address range being accessed by the data requests within the specified time interval may be recorded. For example, for a specified time interval [0, 3600 s], assume the time step to check and update the access frequencies is $T_{interval}$. Then when the time moves to 3601 seconds (3601 s), the access information for the interval [0 s, 1 s], which is now passed the 3600 second interval, may be removed, all the relevant counters inside the address range list can be updated. For example, accesses to the relevant data made during the removed interval can be dropped from the address range list by decrementing the corresponding counters for the relevant data. New requests arriving in the time interval [3000 s, 30001 s] can be recorded in the access history list, and the relevant counters inside the address range list can be updated accordingly.

Assuming the IOPS is 200, then there are around 720 k requests received, and access ranges and access timestamps can be recorded in the access history list. The extra memory consumption can be calculated through:

$$S_{mem}^{ma} = IOPS \times (T_l + T_{interval}) \times N_{info}^{ma}$$

where IOPS is the IOPS of the incoming workload. $T_l$ is the time interval utilized for the long-term hot data identification. $T_{interval}$ is the time step utilized to check and update the access frequencies inside the address range list. $N_{info}^{ma}$ is the extra size of memory utilized for keeping the information of a history request.

In one scenario, assuming the access range id requires 4 bytes, and the access timestamp is represented with 4 bytes, 1 byte would be required to keep the request's read/write information, leaving a total where $N_{info}^{ma}$=9 bytes. Thus, the total memory consumption is around 6.18 MB in this scenario.

The moving average method can provide accurate access information. However, if the long-term hot interval is set to a large value, e.g. 86,400 s, or the IOPS is large, then the memory usage for recording the access information will be very large. Alternatively, another method can be used to count the access frequency, where two time intervals are utilized, such as $T_1$ and $T_2$. There two intervals are set to be equal to $T_l$ for the long-term hot data identification. And $T_2$ is adjacent to $T_1$. Thus the number of accesses in $T_1$ and $T_2$ can be recorded as $f_{t1}$ and $f_{t2}$. Thus the combination of the access frequencies in $T_1$ and $T_2$ can be used to get the overall access frequency through formula (4.2.1):

$$f_{lr}(i) = a_1 f_{t1} + a_2 f_{t2} \quad (4.2.1)$$

where $a_1 = (T_2-t)/T_l$ and $a_2 = (t-T_1)/T_l$, t is the current time, $T_1$ and $T_2$ are changed according to the time. With this, the extra memory space required can be calculated as:

$$S_{mem} = \frac{C_{total}}{S_{range}} \times N_{info} \text{ bytes}$$

where $C_{total}$ is the total drive capacity, $S_{range}$ is the unit size of the one access range in the address range list. $N_{info}$ is the extra number of bytes utilized to keep information for an access range. If the logical block address (LBA) range is small, and the long-term hotness access range is not large, the memory requirement will be smaller than the moving average method. Thus, both of these methods can be utilized under different kinds of assumptions.

The above describes two long-term/short-term hot data identification methods. To improve the portability of the algorithm, fuzzy-logic control can be applied to the duration settings, and the frequency threshold settings to make the parameters more flexible. For example, the unified storage system 100 may perform analysis on collected data and determine adjustments to the duration settings in an attempt to improve performance.

In one embodiment, in order to check the hotness of data, each data chunk is associated with four parameters to record the access frequency for long-term read, long-term write, short-term read and short-term write. Counters associated with the parameters can be used to count the number of accesses in the two time intervals (short and long). For example, reads are tracked over a first time period (short) and a second time period (long). Writes can also be tracked over the two time periods. In some embodiments, the first time period (short) is identical for reads and writes and/or the second time period (long) is identical for reads and writes. In other embodiments, the first time period (short) for reads is different than for writes and/or the second time period (long) for reads is different than the for writes. Other embodiments may track data over more than two time intervals, such as by using an additional medium-term interval.

In one embodiment, to determine whether a data chunk needs to be moved or copied to the SSD pool, a migration factor is defined as f (migration):

$$f(\text{migration}) = \alpha_1(t)\frac{f_{lr}}{f_{lr}^T} + \alpha_2(t)\frac{f_{sr}}{f_{sr}^T} - \beta_1(t)\frac{f_{lw}}{f_{lw}^T} - \beta_2(t)\frac{f_{sw}}{f_{sw}^T} \quad (4.2.2)$$

Inside the equation, the factors $\alpha_1$ $\alpha_2$ $\beta_1$ $\beta_2$ are the coefficients to adjust the migration policies. These factors can be adjusted through the SSD and HDD's properties, such as throughput and IOPS, response time, SSD life span and available capacity, etc. In one embodiment, if f(migration) >0, data is migrated to the SSD pool 120, otherwise, the data is kept at HDD pool 125. The impacts of the drive statuses on the data migration can be found in Table 2 below:

TABLE 2

The impacts of the diver status and the reference values set

| Value | Reference | Effects |
|---|---|---|
| $R_1(t)$ | $R_{1f}$ | The larger $R_1(t)$, the worse HDD performance, more chance of data migration to SSD |
| $R_2(t)$ | $R_{2f}$ | The smaller $R_2(t)$, the better SSD performance, more chance of data migrated to SSD |
| $C_1(t)$ | $C_{1f}$ | The larger $C_1(t)$, more HDD free space, less chance of data migration to SSD |
| $C_2(t)$ | $C_{2f}$ | The larger $C_2(t)$, more SSD free space, more chance of data migration to SSD |
| $I_1(t)$ | $I_{1f}$ | The larger $I_1(t)$ means high HDD load, more data migration to SSD can reduce the HDD load |
| $I_2(t)$ | $I_{2f}$ | The larger $I_2(t)$ means high SSD load, less data migration to SSD can reduce the SSD load |
| $L_1(t)$ | $L_{1f}$ | The smaller $L_1(t)$ means the SSD lifespan is small, less chance of data migration to SSD to reduce the number of writes to SSD. |

$$R_{hdd}=(R_1(t)-R_{1f})/R_{1f}$$

$$R_{ssd}(t)=(R_2(t)-R_{2f})/R_{2f}$$

$$C_{hdd}(t)=(C_1(t)-C_{1f})/C_{hdd}$$

$$C_{ssd}(t)=(C_2(t)-C_{2f})/C_{ssd}$$

$$I_{hdd}(t)=(I_1(t)-I_{1f})$$

$$I_{ssd}(t)=(I_2(t)-I_{2f})$$

$$L(t)=(L_1(t)-L_{1f})/L_{1f}$$

$$\alpha_1(t)=\alpha_{11}R_{ssd}(t)+\alpha_{12}R_{hdd}(t)+\alpha_{13}C_{ssd}(t)-\alpha_{14}C_{hdd}(t)-\alpha_{15}I_{ssd}(t)+\alpha_{16}I_{hdd}(t)+\alpha_{17}L(t)$$

$$\alpha_2(t)=-\alpha_{21}R_{ssd}(t)+\alpha_{22}R_{hdd}(t)+\alpha_{23}C_{ssd}(t)-\alpha_{24}C_{hdd}(t)-\alpha_{25}I_{ssd}(t)+\alpha_{26}I_{hdd}(t)+\alpha_{27}L(t)$$

$$\beta_1(t)=\beta_{11}R_{ssd}(t)+\beta_{12}R_{hdd}(t)+\beta_{13}C_{ssd}(t)-\beta_{14}C_{hdd}(t)-\beta_{15}I_{ssd}(t)+\beta_{16}I_{hdd}(t)+\beta_{17}L(t)$$

$$\beta_2(t)=-\beta_{21}R_{ssd}(t)+\beta_{22}R_{hdd}(t)+\beta_{23}C_{ssd}(t)-\beta_{24}C_{hdd}(t)-\beta_{25}I_{ssd}(t)+\beta_{26}I_{hdd}(t)+\beta_{27}L(t)$$

To make sure all the coefficients calculated are in positive, followings equations, in certain embodiments, can be applied to the calculated coefficients.

$$\alpha_1(t)=\max(\alpha_1(t),0); \alpha_2(t)=\max(\alpha_2(t),0); \beta_1(t)=\max(\beta_1(t),0); \beta_2(t)=\max(\beta_2(t),0).$$

where $m_{ij}$, i=1-4, j=1, 2 are the coefficients for calculating the status of system response time, disk capacity, disk load and SSD lifespan. $\alpha_{lm}$ and $\beta_{lm}$, l=1, 2; m=1-7 are the weighting coefficients for calculating the parameters utilized in equation f(migration). $R_l(t)$, l=1, 2 are the response time of external user requests handled by the HDD pool 125 and the SSD pool 120, $R_{lf}$, l=1, 2 is the reference response time related to QoS for the HDD pool and the SSD pool. $C_l(t)$, l=1, 2 are the remaining effective capacity of the HDD pool and the SSD pool, $C_{lf}$, l=1, 2 is the minimum disk space requirement for the HDD pool and the SSD pool, $C_{hdd}$ is the total capacity of HDD, and $C_{ssd}$ is the total capacity of the SSD pool. $I_l(t)$, l=1, 2 is the current load (combination of throughput and IOPS) of the HDD and the SSD pool. $I_{lf}$, l=1, 2 are the reference loads for HDD pool and the SSD pool. $L_1(t)$ is the current the SSD pool lifespan, and $L_{1f}$ is the minimal the SSD pool lifespan required.

$$I_l(t) = b_1 \frac{P_S(t)}{P_{S,max}} + b_2 \frac{P_R(t)}{P_{R,max}} \quad (4.2.3)$$

$P_S$ and $P_R$ are the average sequential (throughput) and random (IOPS) performance for the HDD or SSD, respectively. $P_{s,Max}$ and $P_{r,Max}$ are the maximum sequential (throughput) and random (IOPS) performance of HDDs or SSDs. $b_i$, i=1, 2 are the coefficients for the throughput and IOPS.

TABLE 3

The impacts of the coefficients on the migration process

| Coefficients A | Coefficients B | A > B | A < B |
|---|---|---|---|
| $\alpha_{ij}$ | $\beta_{ij}$ | The system focuses on the read/write performance | The system focuses on the SSD pool lifespan |
| $\alpha_{1j}, \beta_{1j}$ | $\alpha_{2j}, \beta_{2j}$ | The long term hotness is considered more than short term | The short term hotness is considered more than long term |
| $\alpha_{i1}, \beta_{i1}$ | $\alpha_{i2}, \beta_{i2}$ | The HDD pool response time is considered more than SSD pool | The SSD pool response time is considered more than HDD pool |
| $\alpha_{i3}, \beta_{i3}$ | $\alpha_{i4}, \beta_{i4}$ | The free space left in HDD pool is considered more than SSD pool | The free space left in SSD pool is considered more than HDD pool |
| $\alpha_{i5}, \beta_{i5}$ | $\alpha_{i6}, \beta_{i6}$ | The load of HDD pool is considered more than SSD pool | The load of SSD pool is considered more than HDD pool |

In the equations, all the statuses, such as $R_{hdd}(t)$, $R_{ssd}(t)$, $C_{hdd}(t)$, $C_{ssd}(t)$, $I_{hdd}(t)$, $I_{ssd}(t)$ and $L(t)$ are relative values, thus the selection of coefficients are based on the user requirements. For instance, larger $\alpha_{11}$ means the importance of the SSD pool performance is high. If the response time of the SSD pool is increased, then there is less chance the hot read data will be migrated to the SSD pool. Meanwhile, the smaller $\alpha_{17}$ means the SSD pool lifespan is considered more important, as if the SSD pool lifespan is small, the less chance the data will be moved to the SSD pool.

In fact, I/O patterns of different applications can be learned via some machine learning methods, which will gain some a priori knowledge of these parameters. To decide whether to move the data to the SSD pool or copy the data to SSD pool, the following formula can be used:

$$f(\text{move}) = \alpha_1(t) \frac{f_{lr}}{f_{lr}^T} - C(t) \quad (4.2.4)$$

In one embodiment, if f(move)>0, the data is moved to the SSD pool, otherwise, the data is copied to the SSD pool. In the equation, C(t) is the cost of data migration from SSD pool to HDD pool. Normally, the C(t) value can be set to $\alpha_1(t)$ to make sure that the LRHD is moved to SSD pool, and SRHD data is copied to SSD pool. However, the C(t) value can be adjusted by user based on the detailed requirements.

In one embodiment, based on the formulas (4.2.2) and (4.2.4), the data movement for the other cases in Table 1 of FIG. 4 can be determined. The decision of the data movements can be made through the flowchart shown in FIG. 5.

For case A in Table 1: Since the data is both LRHD and LWHD, the decision to migrate the data to the SSD pool or keep the data in the HDD pool can be made by equation (4.2.2). Meanwhile, if the data is selected for migration to SSD, the hotness of the data is compared with the cost of data migration through formula (4.2.4), and if it satisfies with the condition, the data will be moved to SSD pool.

For case B in Table 1: Since the data is both SRHD and LWHD, formula (4.2.2) can be used to determine whether the data should be migrated from the HDD pool to the SSD pool. Additionally, since the data is not LRHD, if the data needs to be migrated, the data will be copied to the SSD pool.

Similar checks can be done for the other cases. In these formulas, generally the most important one is the parameters and coefficient settings as it can determine the performance of the overall system. For example, if the SSD pool capacity is not enough or the SSD pool lifespan is limited, then $\alpha_1(t)$ and $\alpha_2(t)$ will be decreased and $\beta_1(t)$ and $\beta_2(t)$ will be increased, thus more data will be kept in the HDD pool to save the SSD pool free space and prolong the lifespan. In another case, if the HDD pool load is high, and the HDD pool space is not enough, then the $\alpha_1(t)$ and $\alpha_2(t)$ will be increased, and $\beta_1(t)$ and $\beta_2(t)$ will be decreased, more requests will be directed to SSD pool to improve the system performance, and more hot read and write data will be moved to SSD pool to save the HDD pool space.

Meanwhile, the choice of copying or moving data to the SSD pool 120 for the data migration process can also be controlled by user coefficient settings. For example, when the free space of HDD pool is limited, the hot read data can be moved to the SSD pool instead of copied, thus decreasing the C(t) value in formula (4.2.4). At the same time, the hotness frequency threshold can be reduced to allow more long-term hot data to be migrated to the SSD pool.

Different $\alpha_{1i}$ or $\alpha_{2i}$ can be set to make the system 100 prefer to migrate LHRD or SHRD to the SSD pool 120. The coefficients $\alpha_{1i}$, $\alpha_{2i}$, $\beta_{1i}$, $\beta_{2i}$ can also be set based on the changing user requirements. For example, if the system 100 prefers to keep the hot write data in the HDD pool, the value of $\beta_{1i}$ and $\beta_{2i}$ can be increased or the value $\alpha_{1i}$ and $\alpha_{2i}$ can be decreased.

FIG. 5 illustrates a workflow process 500 for the HDD pool 125, according to one or more embodiments. In the figure, the RHD refers to the LRHD or SRHD, and WHD refers to LWHD or SWHD.

At diamond 505, the process 500 determines whether a data chunk is not RHD. If it is and therefore the data is unlikely to be accessed often, the data chunk would be better stored in the HDD pool. The process continues to block 510, retaining the data chunk in the HDD pool. The process then ends. However, if the data chunk is RHD, the process continues to diamond 515 to determine if the data is better stored in the SSD pool or the HDD pool.

At diamond 515, if the data chunk is not WHD then the process continues to diamond 520. As write hot data will be overwritten often, the data would be better stored on HDD devices, to reduce wear on SSD devices.

At diamond 520, the process determines if the data chunk is LRHD. If it is LHRD, the data chunk is moved to the SSD at block 525. If it is not LHRD, the data chunk is copied to the SSD at block 530. Long term read hot data is likely to be accessed often for a long term period of time, and thus would be better moved to the SSD pool. Moving the data chunk to the SSD pool means the HDD pool does not have to retain duplicate data, freeing up space in the HDD pool.

However, if it is not long term read hot data (i.e., is short term read hot data), then the data chunk is likely not to remain in the SSD pool for long. Thus, copying the data chunk to the SSD pool while retaining a copy in the HDD pool allows the data chunk to be easily removed from the SSD pool in the future without having to additionally migrate the data back to the HDD pool. The process then ends.

Going back to the diamond 515, if the data is neither read hot nor write hot data, then the process continues to diamond 535 to utilize the migration function (examples of which have been described above) to determine where the data should be located. If the migration function determines that the data should be migrated, the process proceeds to diamond 550.

At diamond 550, a move function (examples of which have been described above) is utilized to determine whether the data chunk should be copied to the SSD pool (block 530) or moved to the SSD pool (block 525). The process then ends.

However, if the migration function at diamond 535 determines that the data chunk should not be migrated, the process proceeds to block 510 and ends, keeping the data chunk in the HDD pool.

While the above has discussed hot data migration, in certain situations, cold data may also be migrated. In the SSD pool 120, some data may not be accessed for a certain time period and may be categorized as cold data. If the data is not read for a certain time period, the data may be categorized as read cold data. If it is not written for certain time period, the data may be categorized as write cold data.

In certain embodiments, in SSD pool 120, there are two types of data. One has duplication in the HDD pool 125, such as the data copied from the HDD pool, and the other does not have duplication in the HDD pool, such as the directed allocated data and the data moved from the HDD pool. To save the SSD pool 120 capacity, prolong the SSD pool lifespan, and/or reduce the load on the SSD pool, the following types of data can be moved to HDD pool or directly eliminated:

a. Write hot data: if the data becomes WHD during a certain time period, the data can be moved to the HDD pool to save the life time of SSD devices, and at the same time, save the SSD pool capacity.

b. Read cold data (copied migration): if the data becomes cold during a certain time period, and the data has been copied to the SSD pool, then the data can be directly removed from the SSD pool.

c. Read cold data (moved migration or directly allocated): if the data becomes cold during a certain period, and the data does not have duplication in the HDD pool, then the data can be moved from SSD pool to the HDD pool, thereby removing the data from the SSD pool.

To find the most suitable data to be eliminated or migrated to HDD pool, the following formula can be used:

$$f(\text{remove}) = \beta_1(t)\frac{f_{bw}}{f_{bw}^T} + \beta_2(t)\frac{f_{sw}}{f_{sw}^T} - \alpha_1(t)\frac{f_l}{f_l^T} - \alpha_2(t)\frac{f_s}{s_s^T} - C(t) \quad (4.3.1)$$

Inside the formula C(t) is the cost of migration from SSD pool to HDD pool if the data does not have duplication in HDD pool, otherwise, c(t)=0. After applying the formula to all the data chunk in SSD pool, the most suitable data chunk can be determined, and then data chunk can be eliminated or migrated to the HDD pool.

FIG. 6 illustrates a workflow process 600 for the unified storage system 100, according to one or more embodiments. At block 605, the processes 600 associates, with a data chunk, parameters for long-term read, long-term write, short-term read and short term write. As discussed above, in certain embodiments, the "short" and "long" term are arbitrary values that may be set by the system or an administrator based on the type of workload handled by the unified storage system 100. The "long" time period is longer than the "short" time period to allow for data accesses to be reviewed over a different time period. For example, certain types of data may be accessed consistently, over a long time period but not at a high frequency over a short time period.

In one implementation, a first data chunk is associated with a first parameter corresponds to an access frequency for short term reads, a second parameter corresponding to access frequency for long term reads, a third parameter corresponding to an access frequency for short term writes, and a fourth parameter corresponding to an access frequency for long term writes. The parameters can be used to determine whether the first data chunk meets or exceeds threshold values to be identified as one or more of short term read hot data, long term read hot data, short term write hot data, and long term write hot data. The unified storage system 100 can then assign and/or migrate the first data to the SSD pool 120 or HDD pool 125 as appropriate, based on the identification.

In some embodiments, additional time periods may be used to view data accesses over other time periods. For example, the process 600 may track accesses over 3 or more time periods, such as a few minutes, a few hours, a day, a few days, and/or other time periods.

At block 610, the process 600 updates the parameters to record the number of accesses over a short term and a long term interval. For example, as discussed above, the moving average method or other types of methods can be used to track accesses over the specified time intervals.

At block 615, the process 600 determines, based on the parameters, whether to move or copy the data chunk from the HDD pool 125 to the SSD pool 120. As discussed above in relation to the previous figures, in certain situations, the action is determined by rules and/or functions that specify whether to move or to copy the data chunk.

At block 620, the process 600 copies or moves the data chunk from the HDD pool 125 to the SSD pool 120. If copied, a copy of the data chunk remains on the HDD pool 125. If moved, the existing copy of the data chunk on the HDD pool 125 is deleted.

Figure 7:
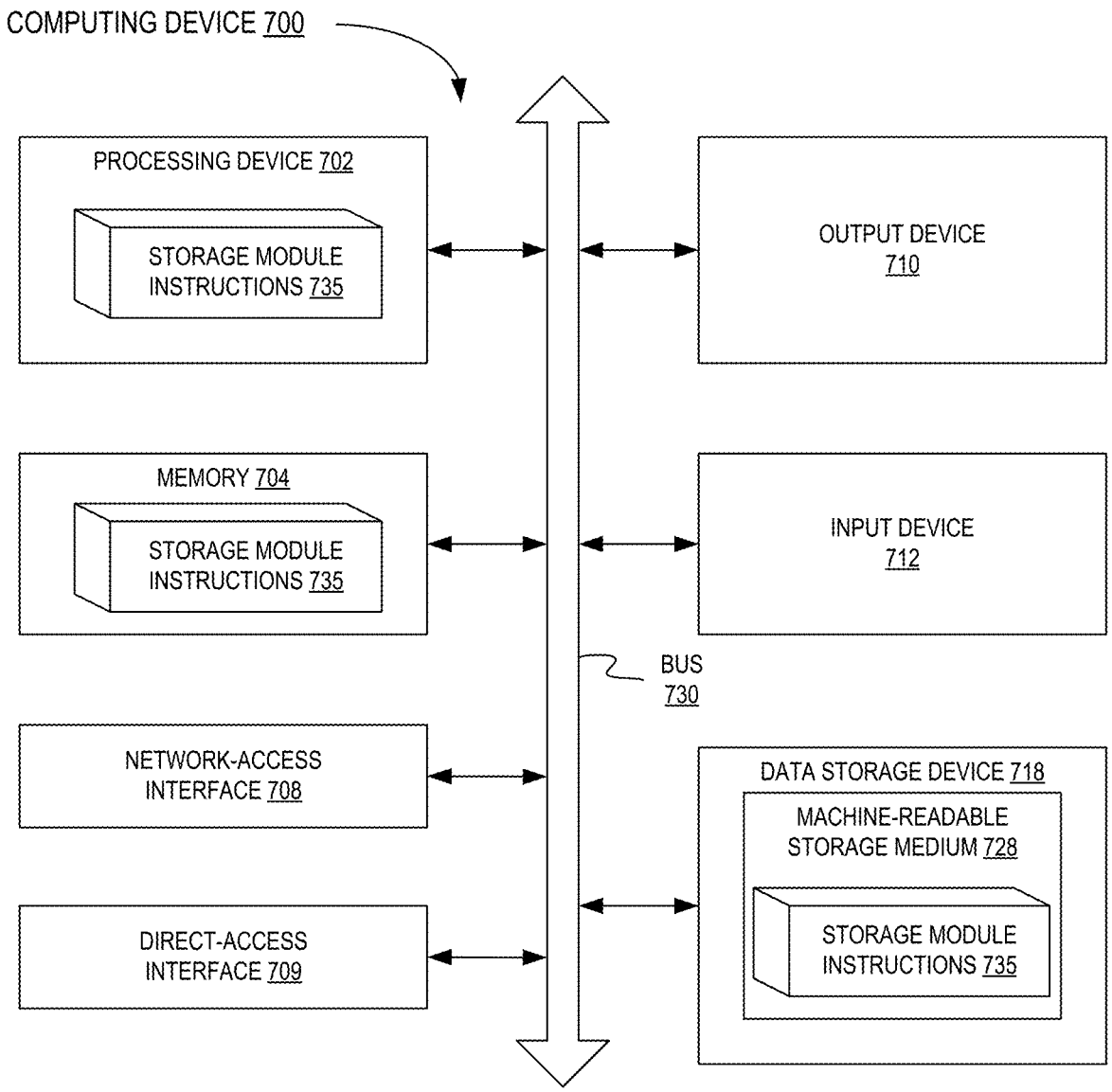
FIG. 7 is a diagram of a computing device 700, in accordance with one or more embodiments.

FIG. 7 is a diagram of a computing device 700, in accordance with one or more embodiments. The computing device 700 may execute instructions that may cause the computing device 700 to perform any one or more of the methodologies (e.g., operations, methods, functions, etc.) discussed herein, may be executed. The computing device 700 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 700 includes a processing device (e.g., a processor, a controller, a central processing unit (CPU), etc.) 702, a main memory 704 (e.g., read-only memory (ROM), flash memory, dynamic random access memory (DRAM) such as synchronous DRAM (SDRAM)), a network-access interface 708, a direct-access interface 709, an output device, 710, an input device 712, and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute storage module instructions 735 (e.g., instructions for the storage module 211 illustrated in FIG. 2) for performing the operations and steps discussed herein.

The computing device 700 may include a network-access interface 708 (e.g., a network interface card, a Wi-Fi interface, etc.) which may communicate with a network (e.g., network 170 illustrated in FIG. 1). The computing device may also include a direct-access interface 709 (e.g., a USB interface, an eSATA interface, a Thunderbolt interface, etc.). The computing device 700 also may include an output device 710 (e.g., a liquid crystal display (LCD) or a cathode ray tube (CRT)), and an input device 712 (e.g., a mouse, a keyboard, etc.). In one embodiment, the output device 710 and the input device 712 may be combined into a single component or device (e.g., an LCD touch screen).

The data storage device 718 may include a computer-readable storage medium 728 on which is stored one or more sets of instructions (e.g., storage module instructions 735) embodying any one or more of the methodologies or functions described herein. The storage module instructions 735 may also reside, completely or at least partially, within the main memory 704 and/or within the processing device 702 during execution thereof by the computing device 700. The main memory 704 and the processing device 702 may also constitute computer-readable media. The instructions may further be transmitted or received over via the network-access interface 708 and/or direct-access interface 709.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A storage system comprising:
a first storage pool comprising:
one or more of a first type of storage drive;
a second storage pool comprising:
one or more of a second type of storage drive, wherein the second type of storage drive is slower than the first type of storage drive; and
one or more processors configured to:
associate, with a first data, a first parameter corresponding to an access frequency for short term reads;
associate, with the first data, a second parameter corresponding to an access frequency for long term reads;
associate, with the first data, a third parameter corresponding to an access frequency for short term writes;
associate, with the first data, a fourth parameter corresponding to an access frequency for long term writes; and
determine whether to store the first data in the first storage pool or the second storage pool based on at least one of the first parameter, the second parameter, the third parameter, and the fourth parameter.

2. The storage system of claim 1, wherein determining whether to store the first data in the first storage pool or the second storage pool comprises:
in response to determining that the first data is in the set RHD∩WHD, allocating the first data to the first storage pool, wherein:
RHD corresponds to hot data for reads,
WHD corresponds to hot data for writes, and
the hot data for reads and the hot data for writes are identified based on at least two of the first parameter, the second parameter, the third parameter, and the fourth parameter.

3. The storage system of claim 2, wherein determining whether to store the first data in the first storage pool or the second storage pool further comprises:

in response to determining that the first data is in the set $\overline{RHD} \cap WHD$, allocating the first data to the second storage pool.

4. The storage system of claim 2, wherein determining whether to store the first data in the first storage pool or the second storage pool further comprises:
   in response to determining that the first data is in the set $\overline{RHD} \cap \overline{WHD}$, allocating the first data to the second storage pool.

5. The storage system of claim 2, wherein determining whether to store the first data in the first storage pool or the second storage pool further comprises:
   in response to determining that the first data is in the set of RHD∩WHD, utilizing the following functions to select between the first storage pool and the second storage pool:

$F(t) = f_{SSD}(t) - f_{HDD}(t)$ $f_{HDD}(t) = \beta_{11}(R_1(t) - R_{1f}) + \beta_{12}(C_{1f} - C_1(t)) + \beta_{13}(I_1(t) - I_{1f}),$
and $f_{SSD}(t) = \beta_{21}(R_2(t) - R_{2f}) + \beta_{22}(C_{2f} - C_2(t)) + \beta_{23}(I_2(t) - I_{2f}),$ wherein:
   $R_i(t)$, i=1, 2 corresponds to requested response times,
   $\beta_{lm}$, l=1, 2; m=1, 2, 3 corresponds to weighting coefficients,
   $C_{if}$, i=1, 2 corresponds to minimum disk space requirements,
   $I_i(t)$, i=1, 2 corresponds to current load, and
   $I_{if}$, i=1, 2, corresponds to reference loads.

6. The storage system of claim 1, wherein:
   the first storage pool comprises solid state drives; and
   the second storage pool comprises hard disk drives.

7. The storage system of claim 1, wherein determining whether to store the first data on the first storage pool or the second storage pool comprises:
   in response to determining that the first data is read hot data based on at least one of the first parameter and the second parameter, retaining the first data in the second storage pool.

8. The storage system of claim 1, wherein determining whether to store the first data in the first storage pool or the second storage pool comprises:
   determining that the first data is in the set $\overline{LWHD} \cap \overline{SWHD} \cap LRHD$ based on at least three of the first parameter, the second parameter, the third parameter, and the fourth parameter, wherein:
      LWHD corresponds to long term write hot data,
      SWHD corresponds to short term write hot data, and
      LRHD corresponds long term read hot data; and
   moving the first data from the second storage pool to the first storage pool.

9. The storage system of claim 1, wherein determining whether to store the first data in the first storage pool or the second storage pool comprises:
   determining that the first data is in the set $\overline{LWHD} \cap \overline{SWHD} \cap \overline{LRHD} \cap SRHD$ based on the first parameter, the second parameter, the third parameter, and the fourth parameter, wherein:
      LWHD corresponds to long term write hot data,
      SWHD corresponds to short term write hot data,
      LRHD corresponds long term read hot data, and
      SRHD corresponds to short term read hot data; and
   copying the first data from the second storage pool to the first storage pool.

10. A method of migrating data between storage pools, the method comprising:
   associating, with a first data, a first parameter corresponding to an access frequency for short term reads;
   associating, with the first data, a second parameter corresponding to access frequency for long term reads;
   associating, with the first data, a third parameter corresponding to an access frequency for short term writes;
   associating, with the first data, a fourth parameter corresponding to an access frequency for long term writes; and
   determining whether to store the first data in a first storage pool comprising storage drives of a first type or a second storage pool comprising storage drives of a slower, second type based on at least one of the first parameter, the second parameter, the third parameter, and the fourth parameter.

11. The method of claim 10, wherein determining whether to store the first data in the first storage pool or the second storage pool comprises:
   in response to determining that the first data is in the set of RHD∩$\overline{WHD}$, allocating the first data to the first storage pool, wherein:
      RHD corresponds to hot data for reads,
      WHD corresponds to hot data for writes, and
      the hot data for reads and the hot data for writes are identified based on at least two of the first parameter, the second parameter, the third parameter, and the fourth parameter.

12. The method of claim 11, wherein determining whether to store the first data in the first storage pool or the second storage pool comprises:
   in response to determining that the first data is in the set $\overline{RHD} \cap WHD$, allocating the first data to the second storage pool.

13. The method of claim 11, wherein determining whether to store the first data in the first storage pool or the second storage pool comprises:
   in response to determining that the first data is in the set $\overline{RHD} \cap \overline{WHD}$, allocating the first data to the second storage pool.

14. The method of claim 11, wherein determining whether to store the first data in the first storage pool or the second storage pool comprises:
   in response to determining that the first data is in the set RHD∩WHD, utilizing the following functions to select between the first storage pool and the second storage pool:

$F(t) = f_{SSD}(t) - f_{HDD}(t),$ $f_{HDD}(t) = \beta_{11}(R_1(t) - R_{1f}) + \beta_{12}(C_{1f} - C_1(t)) + \beta_{13}(I_1(t) - I_{1f}),$
and $f_{SSD}(t) = \beta_{21}(R_2(t) - R_{2f}) + \beta_{22}(C_{2f} - C_2(t)) + \beta_{23}(I_2(t) - I_{2f}),$ wherein:
   $R_i(t)$, i=1, 2 corresponds to requested response times,
   $\beta_{lm}$, l=1, 2; m=1, 2, 3 corresponds to weighting coefficients,
   $C_{if}$, i=1, 2 corresponds to minimum disk space requirements,
   $I_i(t)$, i=1, 2 corresponds to current load, and
   $I_{if}$, i=1, 2, corresponds to reference loads.

15. The method of claim 10, wherein:
   the first type of storage drives comprise solid state drives; and the second type of storage drives comprise hard disk drives.

16. The method of claim 10, wherein determining whether to store the first data in the first storage pool or the second storage pool comprises:
in response to determining that the first data is read hot data based on at least one of the first parameter and the second parameter, retaining the first data in the second storage pool.

17. The method of claim 10, wherein determining whether to store the first data in the first storage pool or the second storage pool comprises:
determining that the first data is in the set $\overline{\text{LWHD}} \cap \overline{\text{SWHD}} \cap \text{LRHD}$ based on at least three of the first parameter, the second parameter, the third parameter, and the fourth parameter, wherein:
LWHD corresponds to long term write hot data,
SWHD corresponds to short term write hot data, and
LRHD corresponds long term read hot data; and
moving the first data from the second storage pool to the first storage pool.

18. The method of claim 10, wherein determining whether to store the first data in the first storage pool or the second storage pool comprises:
determining that the first data is in the set $\overline{\text{LWHD}} \cap \overline{\text{SWHD}} \cap \overline{\text{LRHD}} \cap \text{SRHD}$ based on the first parameter, the second parameter, the third parameter, and the fourth parameter, wherein:
LWHD corresponds to long term write hot data,
SWHD corresponds to short term write hot data,
LRHD corresponds long term read hot data, and
SRHD corresponds to short term read hot data; and
copying the first data from the second storage pool to the first storage pool.

19. A storage system comprising:
a first storage pool comprising:
one or more of a first type of storage means;
a second storage pool comprising:
one or more of a second type of storage means, wherein the second type of storage means is slower than the first type of storage means; and
computing means configured to:
associate, with a first data, a first parameter corresponding to an access frequency for short term reads;
associate, with the first data, a second parameter corresponding to an access frequency for long term reads;
associate, with the first data, a third parameter corresponding to an access frequency for short term writes;
associate, with the first data, a fourth parameter corresponding to an access frequency for long term writes; and
determine whether to store the first data in the first storage pool or the second storage pool based on the first parameter, the second parameter, the third parameter, and the fourth parameter.

20. The storage system of claim 19, wherein determining whether to store the first data in the first storage pool or the second storage pool comprises:
in response to determining that the first data is in the set $\text{RHD} \cap \overline{\text{WHD}}$, allocating the first data to the first storage pool, wherein:
RHD corresponds to hot data for reads,
WHD corresponds to hot data for writes, and
the hot data for reads and the hot data for writes are identified based on at least two of the first parameter, the second parameter, the third parameter, and the fourth parameter.

\* \* \* \* \*